United States Patent
Van Romer

[11] Patent Number: 5,316,175
[45] Date of Patent: May 31, 1994

[54] FOLDABLE SPILL COLLECTOR CONTAINER

[76] Inventor: Edward W. Van Romer, 1018 Arrowhead Point, Anderson, S.C. 29625

[21] Appl. No.: 84,079

[22] Filed: Jun. 28, 1993

Related U.S. Application Data

[63] Continuation of Ser. No. 971,580, Nov. 5, 1992, abandoned.

[51] Int. Cl.$^5$ .............................................. B65D 1/37
[52] U.S. Cl. ................................... 220/573; 220/9.1; 220/4.12; 4/585
[58] Field of Search ............... 220/7, 571, 573, 9.1, 220/4.12; 4/487, 585, 586, 593; 184/106

[56] References Cited
U.S. PATENT DOCUMENTS

| | | | |
|---|---|---|---|
| 92,364 | 7/1869 | Rider | 4/585 X |
| 2,378,159 | 6/1945 | Royer | 220/9.1 X |
| 4,890,343 | 1/1990 | Schlags | 4/585 |
| 5,090,588 | 2/1992 | Van Romer et al. | 220/573 |

Primary Examiner—Steven M. Pollard
Attorney, Agent, or Firm—Cort Flint; Henry S. Jaudon

[57] ABSTRACT

A portable foldable containment (10) is illustrated for use in containing spilled material and preventing environmental contact. Containment (10) includes a floor (14) and integral side walls (16, 18, 20, 22). Rigid side braces (A) internal braces (B) and wall bracing elements (C) provide support to enable walls (16, 18, 20, 22) to extend upright a considerable distance. Internal braces (B) consist of a first brace segment (26), a second brace segment (28) and a hinge (30). Wall bracing elements (C) consist of a vertical leg (64), a horizontal leg (66), and a resilient hinge (68). These components enable the internal braces (B) and wall bracing elements (C) to be folded allowing walls (16, 18, 20, 22) to be laid horizontally for passage of a vehicle.

7 Claims, 2 Drawing Sheets

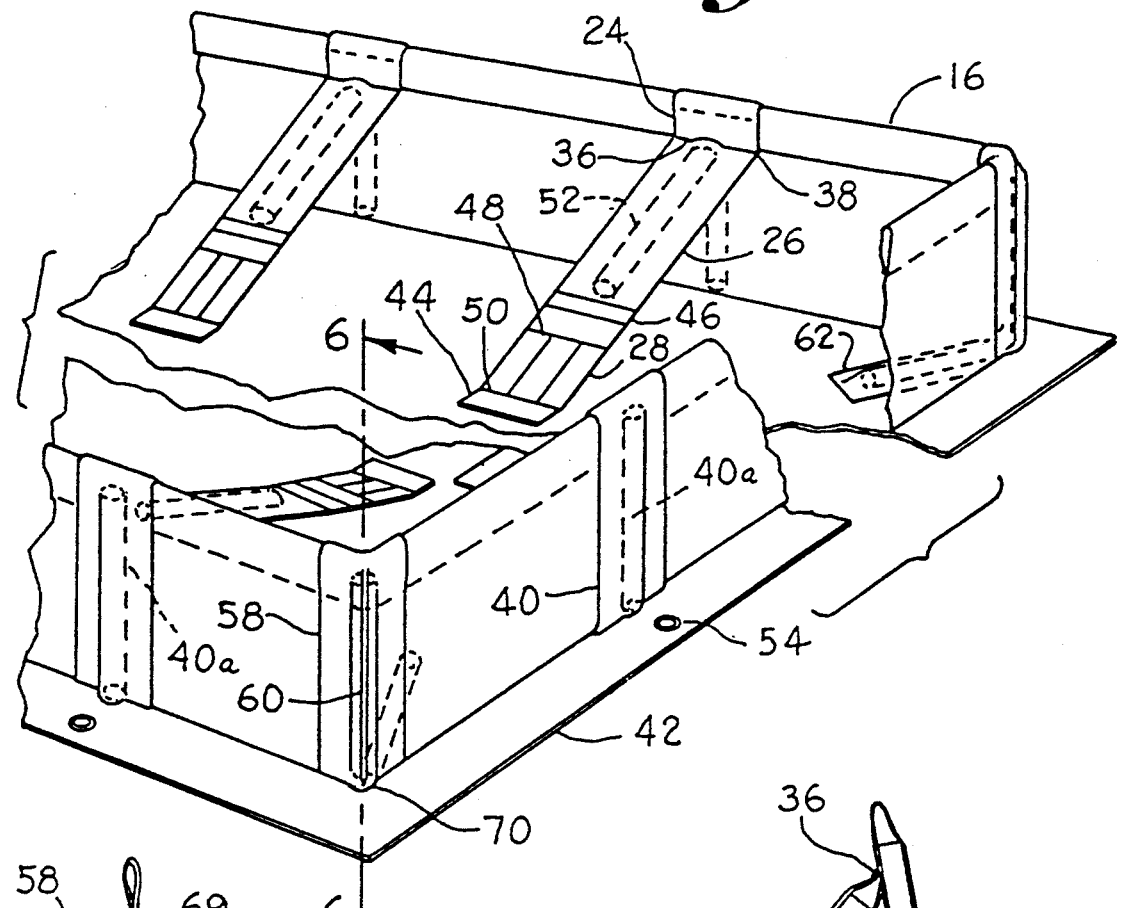
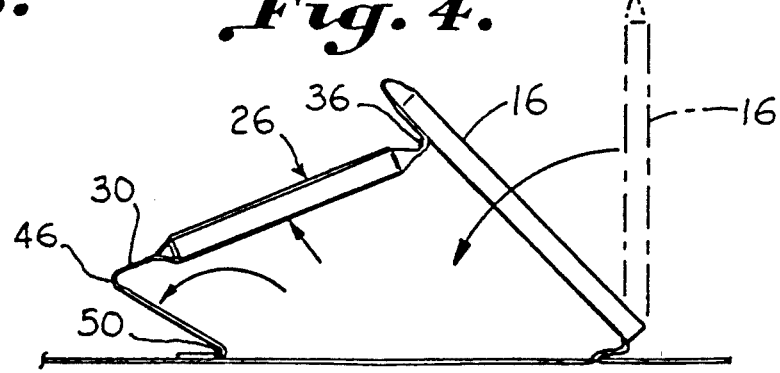

FOLDABLE SPILL COLLECTOR CONTAINER

This is a continuation of copending application(s) Ser. No. 07/971,580, filed on Nov. 5, 1992, now abandoned.

BACKGROUND OF THE INVENTION

The invention relates to a portable, foldable containment device for hazardous chemicals, such as petrochemicals, and the like, and the prevention of environmental contamination by the chemicals. For example, environmental contamination is the long-term result of point source spills in the transfer of petrochemicals and the like from one container to another. In particular, the problem of loading and off-loading petrochemicals and preventing environmental contamination is a problem to which considerable attention need be given because in the transfer of the chemicals, spills can occur and it is necessary to prevent the spill from absorption in the soil.

In the past, temporary, disposable, or stationary containments have been provided in which a plastic membrane or fabric which contains the chemical is supported by air inflatable walls or foam for containing the chemical. U.S. Pat. No. 4,671,024 discloses a disposable drip pan for use under a vehicle which contains dirt or other matter and to prevent the same from soiling or contaminating a floor surface at a fixed site. Air inflated sleeves or radially compressible pipe tubing form a ridge which surrounds a floor of the drip pan to contain material falling off the vehicle. While a vehicle may be driven over the ridge, the ridge is not sufficient for containing liquid spills, such as agricultural chemicals, in large volumes, nor is it fastened to the floor to prevent dislocation by prop wash from aircraft. The corners are not designed to withstand impact from vehicle traffic. Similar temporary containment systems are known which may be folded, assembled, inflated, and transported having a rubberized fabric which withstands rough treatment and a broad range of chemicals. However, again, the support tubes for the side walls are inflatable with air are susceptible to puncture and are separate pieces that require assembly. With the side walls inflated, considerable risk is involved when driving a vehicle on or off the containment, and the walls must be removed to allow vehicle traffic. To deflate the walls permits liquid to escape the containment.

Additionally, U.S. Pat. No. 5,090,588 discloses a portable containment for chemicals that is comprised of resilient braces. While providing good egress into and out of the containment, the resilient nature of this portable containment limits the spill-retention capacity by restricting the maximum height of the containment walls. The resilient nature of the walls prohibit the containment unit from effectively containing a voluminous spill. In the event of a voluminous spill, the wall tends to bow concentrating a disproportional amount of pressure upon a small area of the containment and hence increasing the risk of rupturing. Additionally, the interior bracing straps are designed to allow a resiliently braced wall to be driven over by a vehicle, and would not support a much higher wall, thus requiring a rigid brace.

Accordingly, an object of the invention is to provide a portable containment unit having a relatively high wall for containing voluminous spills; and which is economical, portable, and easy to transport and deploy, and which may be reused.

Another object of the invention is to provide a containment having a rigidly enforced side wall for containing a large spill of hazardous chemicals and the like which is truly portable in that it may be folded, transported, and reused at different sites without disassembly or reassembly being required.

Another object of the invention is to provide a foldable portable containment unit for the prevention of ground spills which is highly durable and can withstand vehicle traffic onto and off of the unit.

Another object of the invention is to provide a portable containment unit which is portable, requires no assembly at the site, can withstand vehicle traffic over the walls of the containment unit, and can tolerate toxic chemicals such as pesticide solutions.

SUMMARY OF THE INVENTION

The above objectives are accomplished according to the invention by providing a portable foldable containment for containing spilled material and preventing environmental contact. A floor is composed of sheet material and upstanding walls composed of sheet material integrally connected to the floor for containing the spilled material in cooperation with the floor. Vertically-extending unitary rigid side braces are attached to the walls and are spaced around a periphery of the wall to brace the walls in an upright position while allowing the walls to be folded. Internal braces are attached between the walls and floor to brace the wall to maintain the wall in an upright position. Wall bracing elements which may be either rigid or resilient are attached between the walls and floor, preferably at the corners of the walls, to assist in maintaining the walls in an upstanding position.

The internal braces have a first brace segment affixed to the walls and a second brace segment which is attached to the floor. The first brace segment is stiffer than the second with a hinge connecting the two segments. The hinge is of a lesser stiffness than either the first or second brace segment. Fold lines exist where the first segment connects with the wall, the second segment connects to the floor, where the first segment connects to the hinge and where the second segment attaches to the hinge. The fold lines allow the hinge to pivot allowing the walls to be folded in a horizontal position and permit a vehicle to pass over the wall. The first brace segment also encloses an elongated reinforcing member having a prescribed stiffness which allows the walls to stand upright when no force is being exerted outwardly against the wall.

Side braces include rigid vertical stays carried within vertical sleeves carried vertically by the walls. The vertical sleeves are formed by extensions of the internal braces which extend over each of the side braces and are secured to the outer surface. A perimetal flap is carried by the floor and extends outwardly away from the wall means for allowing the device to be fastened to a ground surface.

The wall bracing elements which may include both rigid and resilient elements, preferably located near the corners, include rigid vertical stays, rigid horizontal stays and resilient hinges which enjoin the vertical stays with the horizontal stays. The rigid vertical stays are carried within vertical sleeves carried vertically by the walls. The rigid horizontal stays are carried within horizontal sleeves carried horizontally by the floor. The apron contains an opening which allows the resilient hinge to pass. When the containment is folded, the resilient hinges allow the vertical legs to pivot in a direction towards the horizontal legs. When the containment is unfolded, the resilient hinges urge the vertical legs to an upstanding position and the combination of the vertical stays with the horizontal stays in conjunction with the resilient hinges maintain the walls of the containment in an upright position.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 is a perspective view illustrating a containment device constructed according to the present invention with part cut away;

FIG. 4 is perspective side view illustrating the a hinge in an upright position; and FIG. 5 is a perspective side view illustrating the hinge being unfolded.

FIG. 6 is a perspective view illustrating the wall bracing element taken along line 6—6 of FIG. 3.

DESCRIPTION OF A PREFERRED EMBODIMENT

Figure 1:
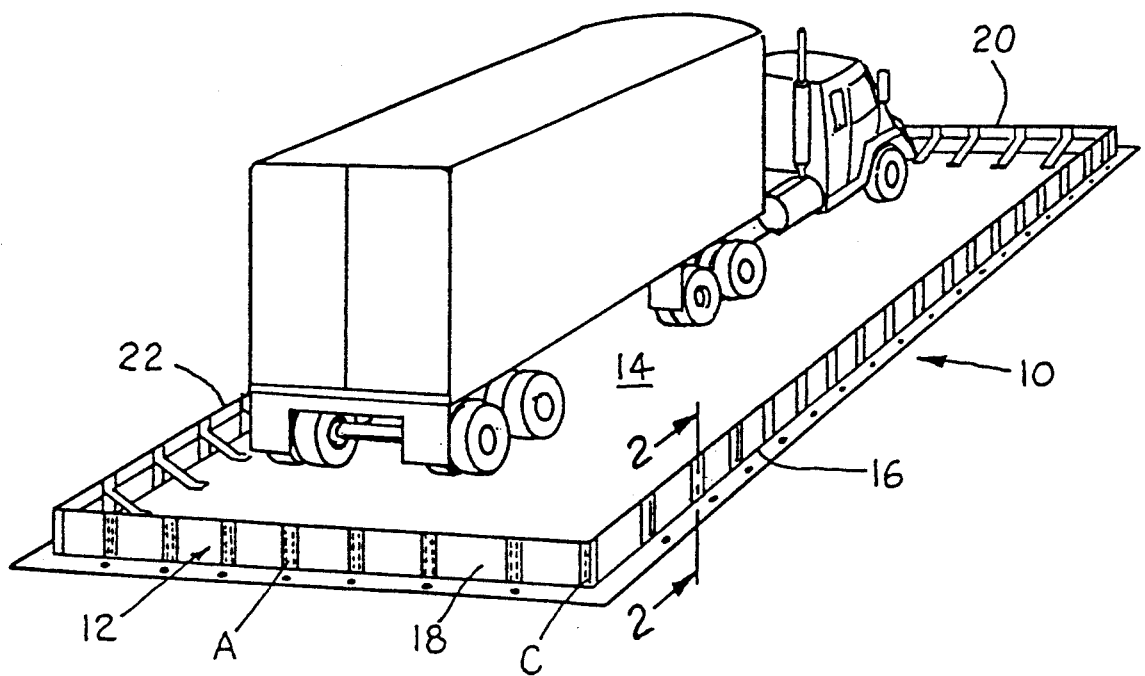
FIG. 1 is a perspective view illustrating a tractor and trailer parked on a containment device constructed according to the invention.

Referring now in more detail to the drawings, as can best be seen in FIG. 1, a portable containment device, designated generally as 10, having a foldable wall designated generally as 12 is illustrated for containing spilled material such as petrochemicals to prevent environmental contact and ground water contamination. As illustrated, portable containment 10 includes a floor 14 composed of sheet material. Foldable wall 12 extends around a periphery of the containment. The foldable wall 12 is composed of sheet material integrally connected to the floor for containing spilled material in cooperation with the floor. Preferably, the sheet material which the floor and wall is comprised of includes a modified vinyl or polyurethane coated woven synthetic fabric. A suitable fabric for agricultural and/or industrial use is available from the Seaman Corporation of Wooster, Ohio, product number XR-5 or from Cooley, Inc., of Pawtucket, Rhode Island, model number L3284 NESU. The sheet material may be folded up at the sides to provide the wall or the wall may be integrally attached to a separate floor material such as by thermal welding or R.F. welding Preferably foldable wall 12 comprises a rectangular wall consisting of individual upstanding walls 16, 18, 20, 22. It is to be understood, of course, that other wall configurations such as triangular, oval, circular, may also be used without departing from features of the invention.

Brace means for bracing the walls in an upstanding position while allowing the walls to fold horizontally include rigid side braces A, internal braces B and wall bracing elements C. Rigid side braces A extend vertically and are attached to upstanding walls 16, 18, 20, 22 in a manner to be more fully described. Internal braces B support the upstanding walls and retain them upright. Wall bracing elements C also support the upstanding walls and retain them upright in a manner to be more fully disclosed.

Figure 2:
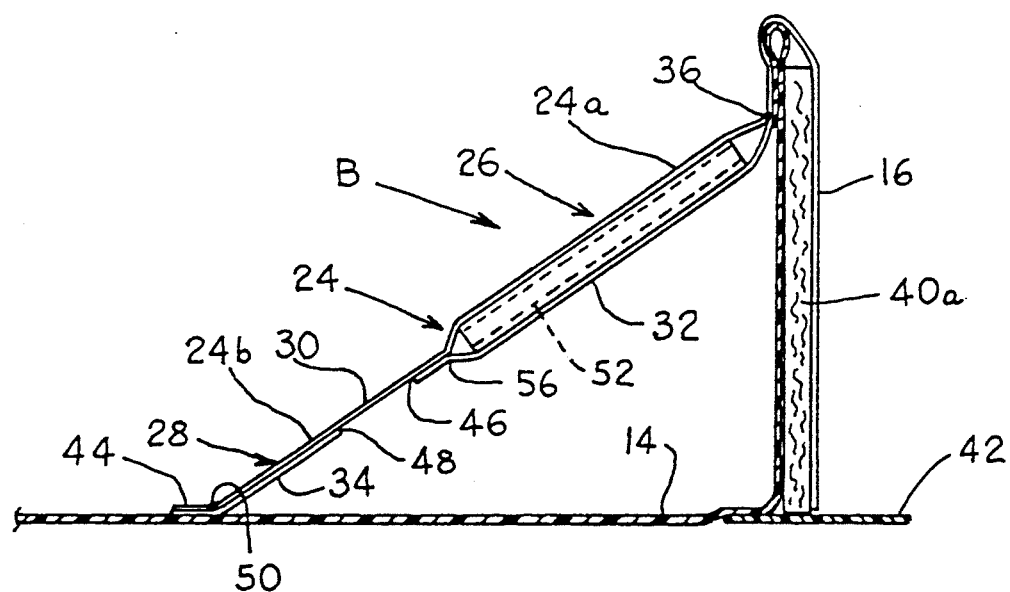
FIG. 2 is a sectional view taken along line 2—2 of FIG. 1.

As can best be seen in FIG. 2, each internal brace consists of a strap 24 which extends from the floor 14 across an upper edge of wall 16 to a perimetal flap. Strap 24 includes a first brace segment 26 and a second brace segment 28 connected by a hinge 30. First brace segment 26 includes an upper end 24a of strap 24 heat welded to an upper stabilizer 32. Second brace segment 28 includes a lower end 24b of strap 24 heat welded to a lower stabilizer 34. Hinge 30 has a thickness less than that of the second brace segment 28 and second brace segment 28 has a thickness less than that of the first brace segment 26.

As can best be seen in FIGS. 2 and 3, the first brace segment 26 is heat welded to the upper portion of upstanding wall 16 at 36. A fold line 36 is imprinted into strap 24 when heat welded to wall 16. Strap 24 is heat sealed at the top of each wall and heat sealed down the sides of each wall to form first vertical sleeve 40 terminating at a perimetal flap 42. Received inside first vertical sleeve 40 are rigid stays 40a which may be in the form of wood or plastic dowels which define rigid side braces A. The second brace segment 28 is heat welded to floor 14 at tab 44. A fold portion 46 is formed in strap 24 at the lower end of first brace segment 26 forming a first pivot line. A second fold portion 48 is formed in flexible strap 26 at the upper end of the second brace segment 28. A third fold line 50 is imprinted into the second brace segment 28 when heat welded to floor 14 at tab 44 forming a second pivot line.

Elongated reinforcing member 52 is enclosed within the first brace segment 26. This elongated reinforcing member is made from a deformable material such as a length of rubber hose. Perimetal flap 42 provides an anchor means for securing the containment. Perimetal flap 42 include a set of grommets 54 for anchoring the flap to the ground.

As can best be seen in FIG. 4, the length of the first brace segment 26 is such that when no force is being exerted against the wall 16 from the inside, the wall will be maintained upright by an abutment end 56 of the first brace segment 26 abutting the floor 14 of the containment. As seen in FIG. 2, when a force is exerted from within the container outward, such as may be caused by retained fluid against the wall 16, internal braces B are extended to permit wall 16 to be perpendicular to floor 14.

As can best be seen in FIG. 5, wall 16 may be folded inward to lie over floor 14. This is realized by pivoting the first brace segment upwardly and clockwise along first pivot portion 46 and pivoting second brace segment 28 rearwardly and counterclockwise along pivot fold line 50. When folded and overlying floor 14, wall 16 may be driven over by a vehicle.

As best seen in FIG. 3, second vertical sleeve 58 is heat welded to wall 16 at corner 60. Horizontal sleeve 62 is heat welded to floor 14 and at corner 60 of wall 16. The horizontal axis of the horizontal sleeve 62 bisects corner 60.

As best seen in FIGS. 3 and 6, wall bracing element C is comprised of a vertical stay 64, a horizontal stay 66 and a resilient hinge 68. Vertical stay 64 is carried vertically by second vertical sleeve 58. Horizontal stay 66 is carried horizontally by horizontal sleeve 62. A rubber hose 69 encloses the vertical stay 64, horizontal stay 66 and the resilient hinge 68, which may be a solid rubber core. The vertical and horizontal stays may be rigid such as being constructed using wooden o plastic dowels. The wall 16 includes an opening 70. Rubber hose 69 is received in vertical sleeve 58 and passes through opening 70 to be received in horizontal sleeve 62. It may be possible, for some applications, that wall bracing elements C are adequate to support the upstanding walls without rigid braces A.

The containment unit may also incorporate a combination of fibers and coating materials to provide a reliable, reusable containment designed for agricultural pesticide application in the field or at air strips, as well as other industrial and commercial applications. The construction of the containment and materials offer an excellent flexibility to meet the practical, every day needs of the application being made. The containment needs only minutes to be moved and set up at a different location to prevent containment and ground spills. For example, in one application, a portable containment was utilized having a size of 45'×90'. The chief concern is easy access and high likelihood of catching and preventing any spill from any vehicle location. The wall height may range from 1 foot to 17 inches. When the wall is higher, the braces A may be spaced closer, or the braces may be constructed of heavier material example, a wall from 1 to 1½ feet may have rigid braces A spaced 2 feet apart. Rigid side braces A, together with internal braces B, maintain the high sides erect under pressure from large volumes of fluids inside the containment, and prevent outward bowing of the sides.

While a preferred embodiment of the invention has been described using specific terms, such description is for illustrative purposes only, and it is to be understood that changes and variations may be made without departing from the spirit or scope of the following claims

What is claimed is:

1. A portable containment for containing spilled material which may be easily folded for transportation comprising:
    a floor composed of sheet material;
    a foldable generally upstanding wall composed of sheet material integrally connected to said floor for containing the spilled material in cooperation with said floor;
    a plurality of rigid side braces integrally carried by said peripheral wall and spaced around said wall to brace said wall generally in an upright configuration while allowing said wall to be folded inwardly;
    a plurality of internal foldable braces interconnecting with said wall and said floor having extended positions preventing outward movement of said wall and maintaining said wall in aid generally upright configuration when containing said spilled material, and having intermediate inclined upright positions for maintaining said wall in an inclined position when empty and also having inwardly folded positions in which said wall is folded generally horizontal permitting a vehicle to drive over said folded wall;
    said internal foldable braces including first brace segments having first, abutment ends affixed to said wall, second abutment ends, and an elongated reinforcing member extending generally between said first and second abutment ends,
    a second brace segment secured to said floor, and a hinge portion connected with said second abutment end and arranged intermediate said first and second brace segments having a firs pivot about which said first brace segment pivots to allow said first brace segment to move upwardly and clockwise over said second brace segment, as said second segment moves downwardly and counterclockwise, to allow said wall to move to said folded position; and
    said intermediate upright positions being maintained when said second abutment ends engage said floor with said first abutment ends affixed with said wall to support the wall in an inclined, upstanding position.

2. The device of claim 1 wherein said containment includes a plurality of wall bracing elements integral with said upstanding wall and said floor which assist in maintaining at least portions of said wall in said upstanding configuration.

3. The device of claim 2 wherein each said wall bracing element is comprised of a horizontal leg which is interconnected to said floor, a vertical leg which is interconnected to said wall, and a resilient hinge interconnecting said horizontal leg and said vertical leg;
    whereby when a force is exerted against said vertical leg said resilient hinge allows said vertical leg to pivot in a direction towards the horizontal leg and when said force is removed said resilient hinge urges said vertical leg to said upstanding configuration.

4. The device of claim 3 wherein said wall has a plurality of corners; and said wall bracing elements are carried near said corners.

5. The device of claim 1 wherein said reinforcing members are deformable so as to reduce damage to said wall and floor in the event said wall is driven over with said internal s in said extended configuration.

6. The device of claim 1 wherein said first brace segment comprises a multi-layer heat sealable material, and said reinforcing member comprises elongated deformable elements heat sealed between said heat sealable material of said first brace segments.

7. The device of the claim 1 wherein said hinge portion comprises a web of flexible material having a third stiffness which is less than said first and second stiffness of said first and second brace segments.

* * * * *